G. P. JACKSON.
FURNACE.
APPLICATION FILED MAR. 22, 1920.
1,437,182.
Patented Nov. 28, 1922.
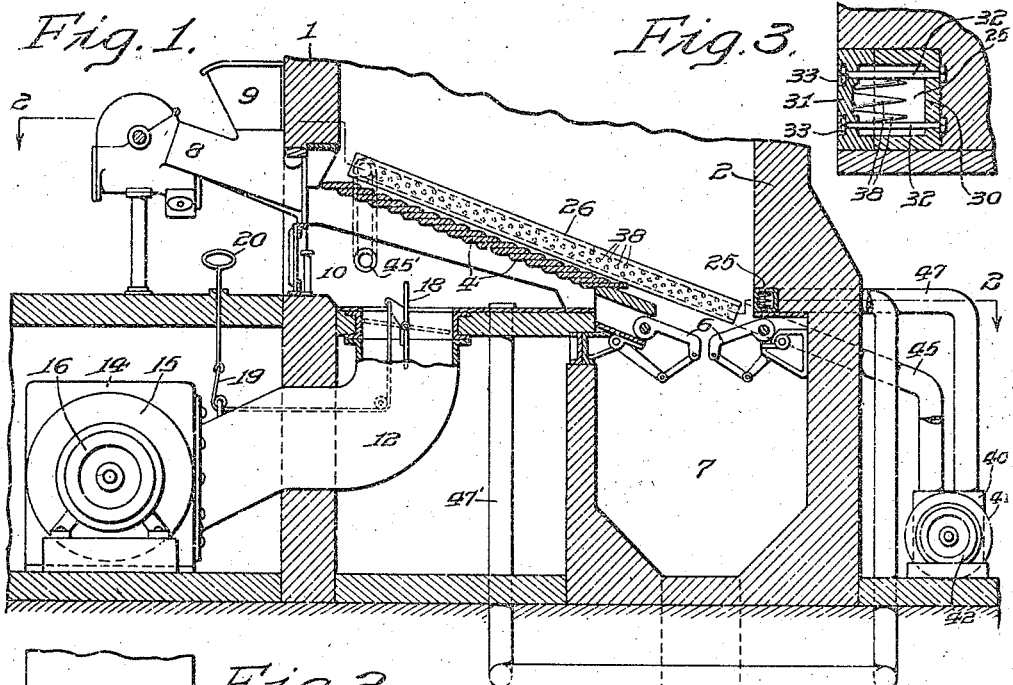
Fig. 1.
Fig. 3.
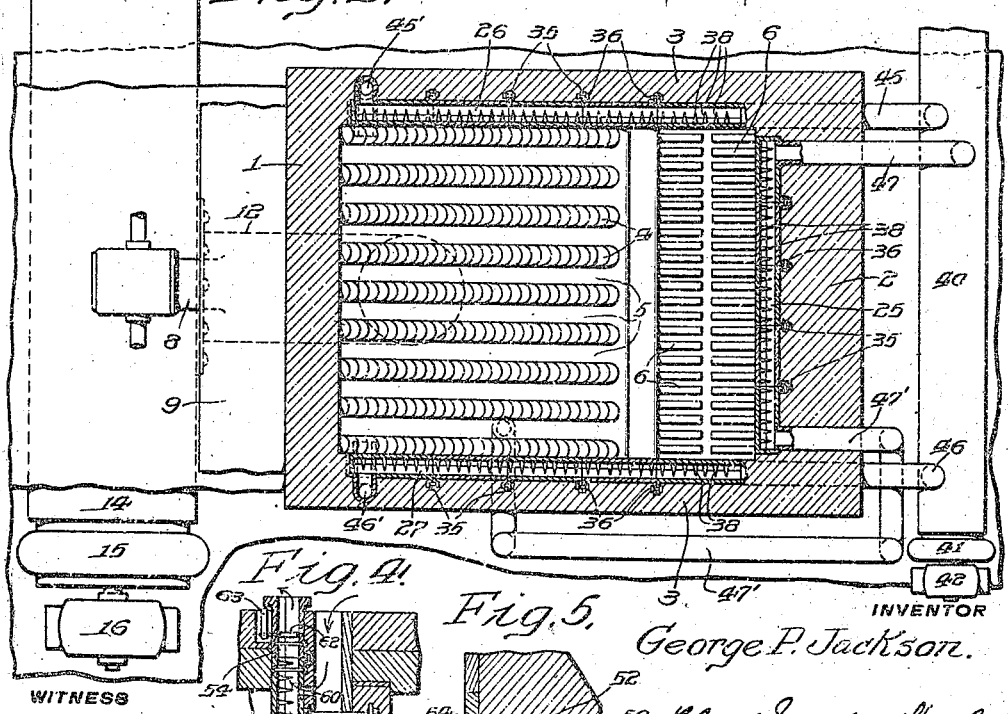
Fig. 2.
Fig. 4.
Fig. 5.
INVENTOR
George P. Jackson.
WITNESS
ATTORNEYS Patented Nov. 28, 1922.                                     1,437,182

UNITED STATES PATENT OFFICE.

GEORGE P. JACKSON, OF MOORE, PENNSYLVANIA.

FURNACE.

Application filed March 22, 1920. Serial No. 367,613.

*To all whom it may concern:*

Be it known that I, GEORGE P. JACKSON, a citizen of the United States, and a resident of Moore, in the county of Delaware and State of Pennsylvania, have invented certain new and useful Improvements in Furnaces, of which the following is a specification, reference being had to the accompanying drawing.

In the operation of furnaces, more particularly those employed beneath the boilers in ordinary industrial installations, it has been found that there is a distinct tendency for the non-combustible or refuse portions of the fuel to fuse to the furnace walls in those localities in which the burning fuel is in contact therewith, thus forming a hard mass of clinker attached to the furnace wall, with consequent known disadvantages.

Among the principal objects of my invention is the provision of means whereby the formation of these clinkers will be prevented, which may be employed in practically any type of furnace ordinarily utilized for supplying the heat in permanent boiler installations or the like.

My invention further includes the provision of means of the character aforesaid, which may be installed in either old or new furnaces at a relatively low cost and which will be economical in operation, so that the use of my invention in a given power plant will result in effecting a material saving in the cost of operation of the plant both on account of the increased efficiency obtained when the furnace walls are kept clean and free from adhering clinkers, and the saving effected by avoiding the expenditure of time and labor ordinarily required for their removal.

A still further object of my invention is the utilization to assist the combustion in the furnace, of the cooling medium, such as air, which, as hereinafter described, is caused to circulate adjacent the points of contact of the burning fuel and the furnace walls to effect a local reduction of temperature in the latter, whereby the heat units absorbed by the cooling medium are not wasted but are liberated in the interior of the furnace to mingle with the heat units generated by the combustion of the fuel therein.

My invention further includes all of the other various novel objects and features of construction and arrangement hereinafter more definitely specified and described.

In carrying out my invention, I may employ any suitable instrumentalities and combinations and arrangements thereof adapted to effect my desired objects and it will be understood that the details of construction and arrangement will necessarily vary somewhat in different types of power plants in accordance with the particular conditions encountered therein.

My invention contemplates the employment of means to cause the circulation of a cooling medium such as air through suitable closed channels or conduits arranged in the furnace walls adjacent their points of contact with the burning fuel, the medium being supplied to the conduits at a relatively high pressure and velocity, and the utilization of this medium after its passage through the conduits and consequent absorption of heat units to assist the process of combustion in the furnace. I am aware that it has been proposed to effect a circulation of water in a conduit positioned in a furnace wall to reduce the temperature of the wall adjacent its point of contact with the burning fuel, but in such systems the heat absorbed by the water is sometimes lost or difficulties are encountered from the formation of deposits in the system or from other causes and as the cost of pumping water through the conduits is considerable, the expense of operation of such installations has frequently been greater than the expense entailed by the evil which they were intended to obviate.

It has also been proposed to conduct air from the main air supply of the furnace through suitable conduits positioned in the furnace walls, but under such conditions if the air after passing through the conduits is permitted to escape into the atmosphere the heat units which it has absorbed are entirely lost and the pressure in the main air supply so reduced as to materially interfere with the satisfactory operation of the furnace. It has also been proposed to discharge the air into the wind box of the furnace, but under these conditions when the damper between the wind box and the main air supply is fully open and the fuel consequently receiving the maximum quantity of air, practically no circulation takes place through the conduits, since the pressure at the entrance to each conduit is substantially the same as that in the wind box into which it empties. Conversely, when the damper between the main air supply and the wind box is nearly closed, the air circulates very rapidly through the conduits, since the pressure at the entrance of each of them is substantially that of the main air supply while the pressure in the wind box into which they empty is materially less. Hence, when the fire in the furnace is of maximum intensity, substantially no cooling effect is produced, and when the fire is low, a maximum cooling effect is set up.

These various difficulties, however, are obviated in my invention, in which provision is made for the circulation through suitable conduits of any suitable medium, such as air, taken from a supply entirely independent of the main air supply and of sufficient pressure to effect an adequate circulation no matter what may be the pressure in the wind box or other part of the furnace into which it is discharged after its passage through the conduits, and then utilizing the medium so discharged in conjunction with air from the main air supply to assist combustion in the furnace.

To enable those skilled in the art to practise my invention, I have illustrated in the accompanying drawing, and will now proceed to describe, a somewhat typical furnace installation embodying my invention, in which Fig. 1 is a vertical central section through the furnace proper in conjunction with its auxiliaries; Fig. 2, a section on line 2—2 of Fig. 1 looking in the direction of the arrows; Fig. 3, an enlarged fragmentary vertical section of the bridge wall and the conduit positioned therein, and Figs. 4 and 5 enlarged fragmentary horizontal and vertical sections respectively, showing a slightly modified form of conduit particularly adapted for use under certain conditions encountered in practice.

Since my invention is adapted for use in connection with substantially any form of permanent furnace installation whether the same embodies but a single furnace or a plurality of furnaces and whether operated under forced or natural draft, I have for convenience shown in the accompanying drawing but a single furnace proper with its usual and well known auxiliaries, the various parts being illustrated more or less diagrammatically. As shown, the furnace comprises a front wall 1, bridge wall 2, and side walls 3—3, which enclose the furnace bed composed of the tuyères 4 and retorts 5, dumping grates 6—6 being positioned adjacent the foot of the bridge wall over the passage to the ash pit 7. The furnace is provided with an automatic stoker 8 effective to feed fuel from the hopper 9 to the fuel bed, although my invention is not confined to use with furnaces so equipped, and beneath the bed is arranged the usual wind box 10 into which empties the air duct 12 connected at its opposite end with the main air duct 14 in which, under ordinary conditions of operation, a suitable pressure is maintained by the blower 15 operated by a motor 16. To regulate the amount of air passing into the wind box from the duct 12 a damper 18 is arranged in the duct and operated in any convenient manner as by a cable 19 passing over suitably positioned sheaves and terminating in an operating handle 20 convenient to the front of the furnace. All of the parts hitherto described will be entirely familiar to those skilled in the art and require no further description.

Positioned in suitable recesses in the furnace walls adjacent their points of contact with the fuel on the furnace bed, are arranged the conduits or boxes 25, 26 and 27, conduit 25 being in the bridge wall adjacent its lower corner, and conduits 26 and 27 being located in the side walls 3 and preferably following substantially the inclination of the furnace bed. While the several conduits may be formed in any suitable manner, I prefer to construct each of them of a plurality of cast iron sections, each section comprising a rear channel shaped member 30 and a front channel shaped member 31, which, when placed in opposed relation, as best shown in Fig. 3, form a conduit of substantially rectangular cross section, the two members of each section being conveniently secured together by bolts 32 carrying nuts 33, the latter preferably disposed in countersunk holes so they will not project beyond the face of the furnace wall with which the outer face of the member 31 is preferably flush. The sections may be provided with suitable outwardly directed flanges 35 for the reception of bolts 36 which serve to maintain several sections composing each conduit from relative longitudinal movement. In order to increase the radiating surface exposed to the air passing through the conduit, the members 31, which are most nearly adjacent the burning fuel, may be provided with a plurality of radiating fins or spikes 38 extending into the interior of the conduit. It will, however, be understood that the particular design and details of construction of the conduits may be modified as desired.

Means are provided for continuously supplying air to the several conduits at a sufficient velocity and pressure to insure its passage therethrough with sufficient rapidity to cool the portions of the conduit adjacent the burning fuel to a point sufficient to prevent the adherence of unconsumed portions thereof either to the conduit or to a facing of refractory material which may, if desired, be located between the conduit and the fuel, which means may comprise what may for convenience be termed the "high pressure" air duct 40, through which air is forced by a blower 41 operated by a motor 42, and from which suitable ducts lead to the various conduits. In the drawing these ducts are conveniently shown in the form of pipes, but it will of course be understood that they may be made of brick work or any other suitable way. As shown, the duct 45 leads to the conduit 26, the duct 46 to the conduit 27 and the duct 47 to the conduit 25 in the bridge wall, and, if desired, a damper with suitable controlling means may be arranged in each of the ducts to regulate the flow of air therethrough.

Each of the conduits preferably at its end opposite to that at which the ducts 45, 46 and 47 respectively enter is connected with another duct conveniently termed the "discharge duct" which leads in any convenient way to the wind box 10 and empties thereinto, these discharge ducts being designated as 45', 46' and 47', so that air flowing from the high pressure air duct 40 through ducts 45, 46 and 47 to the conduits will after its passage therethrough, be discharged into the wind box 10, from which it passes, along with the air from the main air supply, through the tuyères to assist in the combustion of the fuel on the furnace bed, the heat unit which it has absorbed in its passage through the conduits being thus conserved and returned to the furnace chamber.

Thus, by the employment of my invention adequate cooling of those portions of the furnace walls in contact with the burning fuel is insured under all conditions of operation, since the pressure of the air in the high pressure duct may at all times be maintained at a point sufficient to insure the passage of the air through the several ducts with sufficient rapidity to effect the requisite local reduction of temperature what ever be the pressure in the wind box 10, and since the air utilized in cooling is discharged in the wind box after it has performed its function and is thereafter utilized to assist combustion in the furnace, substantially no more air is required for the operation of a furnace in conjunction with which my invention is employed than for a furnace in which the air necessary to effect the requisite combustion is drawn from but a single source of supply and conducted directly to the wind box as in the ordinary installation.

In Figs. 4 and 5 I have illustrated a slightly modified form of conduit which may be advantageously employed in locations in which it is inconvenient to supply the air for cooling purposes at one end of the conduit and to discharge it at the other. The modified form of conduit shown in these figures is so arranged as to provide two adjacent and parallel air passages 50 and 51, the former being formed in the interior of a box or section 52 preferably rectangular in form and closed at its end opposite to that at which the air is introduced, and the latter being formed between two members 30' and 31' of channel section as in the form of conduit previously described. The box 52 may be held in the furnace wall by bolts 53 and the members 30' and 31' secured to it by bolts 54 corresponding to the bolts 32 shown in Fig. 3, the outer face of the member 31' lying flush with the furnace wall or being covered with a single thin layer of brick 57, a construction which may also be employed as described in connection with the ordinary form of conduits hitherto described and which, under certain conditions of operation, may be advantageously utilized to prevent contact of the metallic conduits with the burning fuel.

When the form of conduit shown in Figs. 4 and 5 is employed, the cooling air from the high pressure conduit 40 is arranged to enter at one end of the passage 50 and pass for the most part entirely therethrough to the other end thereof, which is connected with the passage 51 so that the air then passes to the latter and flows therethrough in an opposite direction to a point adjacent its point of entrance where it passes into one of the discharge conduits and thence to the wind box of the furnace in the manner already described. In order to equalize the pressure between the air in the passages 50 and 51 and to insure a substantially constant temperature throughout the air in the latter, a plurality of small ports 60 may be provided between the passageways, so that some of the air will pass from 50 to 51, without traversing the entire length of the former before doing so, as clearly shown by the arrows in Fig. 4, in which figure a damper 62 with controlling means 63 is also shown for the purpose of regulating the flow of air through the conduit.

Furthermore, while, as stated, the particular form and construction of the conduits may be varied as desired, I prefer to utilize a construction such as I have illustrated in which the conduit is made in a plurality of parts, one of which may be fixed in the furnace wall and the other, which is more nearly adjacent the burning fuel secured thereto, so that the latter may be readily removed when desired either for replacement or to facilitate cleaning the interior of the conduit.

While I have herein illustrated and described but a single embodiment of my invention together with certain slightly modified details thereof and have referred more particularly to the employment of air as a cooling medium, I do not thereby desire or intend in any way to limit myself to the use of the invention in any particular type of power plant installation or with any particular type of furnace, nor to the specific details of construction and arrangement which I have described by way of example, as the same may be modified to adapt the invention to varying conditions encountered in practice and for use with different types of furnaces and in different sorts of installations and with suitable cooling and combustion assisting mediums other than air, without departing from the spirit and scope of the invention as defined by the appended claims.

Having thus described my invention, I claim and desire to protect by Letters Patent of the United States:

1. The combination with a furnace having a fuel support, walls adjacent said support, a wind box beneath said support and main air supplying means for discharging air into said wind box, of means for causing a reduction of temperature of said walls adjacent said fuel support comprising means independent of said main air supplying means for supplying a relatively small amount of air at a pressure relatively higher than that of the air from said main air supplying means, means for conducting said high pressure air through said walls to cool the same, and means for discharging said air into the wind box after its passage through the walls.

2. In a furnace installation, the combination of a fuel support, walls surrounding said support, a wind-box beneath said support and main air supplying means operative to discharge air into said wind box, with means for locally cooling said walls adjacent said fuel support comprising means for supplying air at a constant pressure in excess of that from said main air supplying means but in a quantity relatively small in respect thereto, conduits positioned in said walls and connected with said independent air supplying means, and means for conducting air from said conduits into said wind box.

3. In a furnace installation, the combination of a fuel support, walls adjacent said support, a wind box beneath said support and main air supplying means operative to discharge air into said wind box, means independent of said main air supplying means for supplying air at a pressure in excess of the air pressure in said wind box, conduits positioned in said walls adjacent said fuel support, means for conducting air from said independent air supplying means to said conduits in a quantity relatively small in comparison to that discharged from said main air supplying means, and means for discharging said air from said conduits into the wind box whereby a circulation of air at substantially constant pressure and velocity is maintained in said conduits.

In witness whereof, I have hereunto set my hand this 20 day of March, A. D., 1920.

GEORGE P. JACKSON.